Oct. 23, 1928.
H. B. CHALMERS
1,688,785
POWER TRANSMISSION
Filed May 24, 1927   3 Sheets-Sheet 1
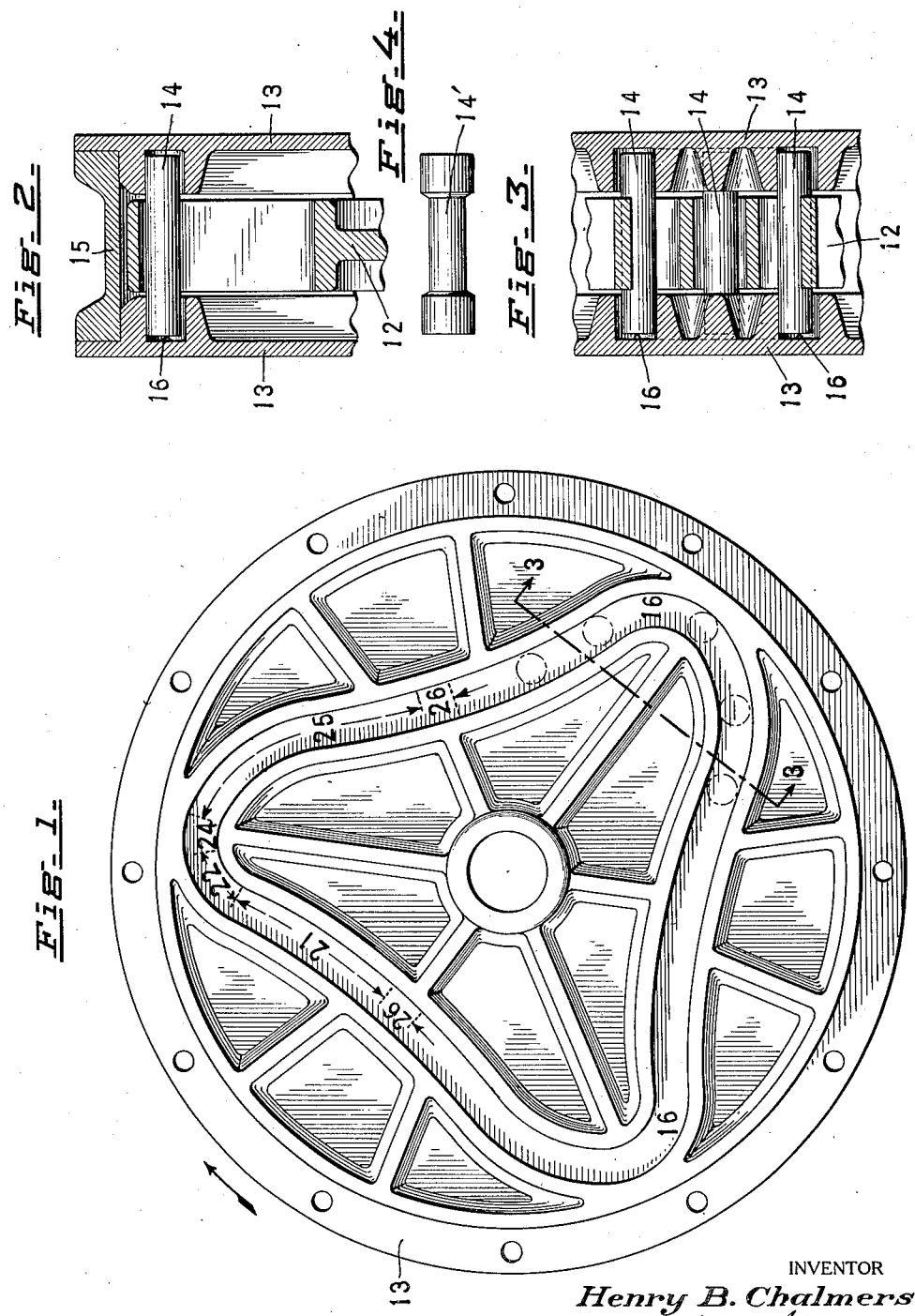
INVENTOR
Henry B. Chalmers,
BY
ATTORNEY Oct. 23, 1928.

H. B. CHALMERS

POWER TRANSMISSION

Filed May 24, 1927

INVENTOR
*Henry B. Chalmers,*
BY
ATTORNEY

Oct. 23, 1928.

H. B. CHALMERS

POWER TRANSMISSION

Filed May 24, 1927    3 Sheets-Sheet 3

1,688,785

INVENTOR
Henry B. Chalmers,
BY
ATTORNEY

Patented Oct. 23, 1928.

1,688,785

UNITED STATES PATENT OFFICE.

HENRY B. CHALMERS, OF NEW YORK, N. Y.

POWER TRANSMISSION.

Application filed May 24, 1927. Serial No. 193,875.

The main object of my invention is to produce a transmission whose ratio of speed is automatically selective according to the load.

One object of my invention is to provide a mechanism by means of which the transmitted speed will vary substantially inversely with the load at usual operating speeds.

In general, the present invention constitutes improvements on the mechanism of my former application, Serial No. 62,756, filed October 16, 1925.

Another object is to so construct and arrange the parts as to produce a more uniform action. Specifically, I have sought to multiply the number of transmitting members so as to reduce the unit pressure on the various parts.

Another object is to transmit a constant power regardless of the speed of the driven member.

Another object is to so arrange the parts that each of the transmitting masses functions a plurality of times during each revolution.

Another object is to provide a mechanism which will produce a forward torque during acceleration as well as deceleration of the transmitting or inertia masses.

Such devices have many uses: for instance, as transmission mechanism for motor vehicles, electric motor drives, certain punch and shearing machines, lathes and machine tools; in fact, invention is generally applicable to the driving of variable loads.

In the accompanying three sheets of drawings, I have illustrated the general principles of the invention.

Fig. 1 is a side view of one of the parts of the transmission mechanism.

Fig. 2 is a fragmentary transverse sectional view of a radial plan on the plane of the line 2—2 of Fig. 5.

Fig. 3 is a transverse sectional view on the plane of the line 3—3 of Figs. 1 and 5.

Fig. 4 is a detailed view of a modified form of a transmitting mass.

Figure 6:
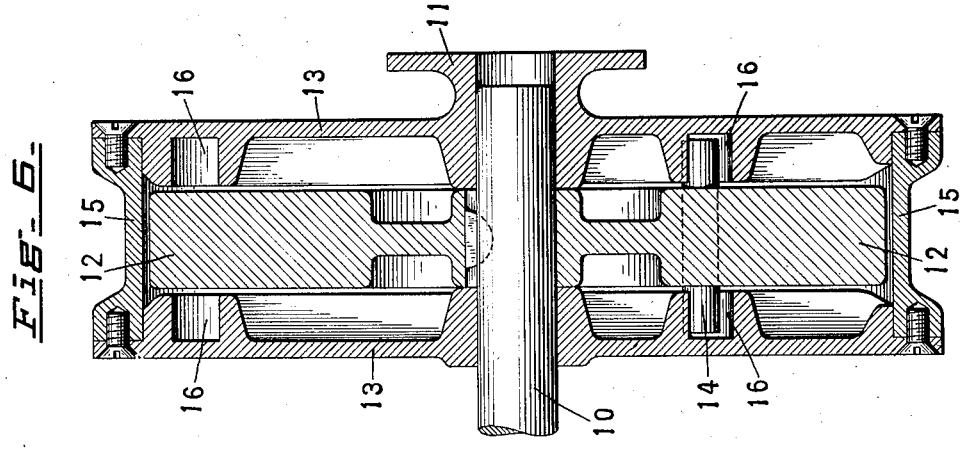
Fig. 6 is a sectional view showing one form of the complete mechanism.
Figure 5:
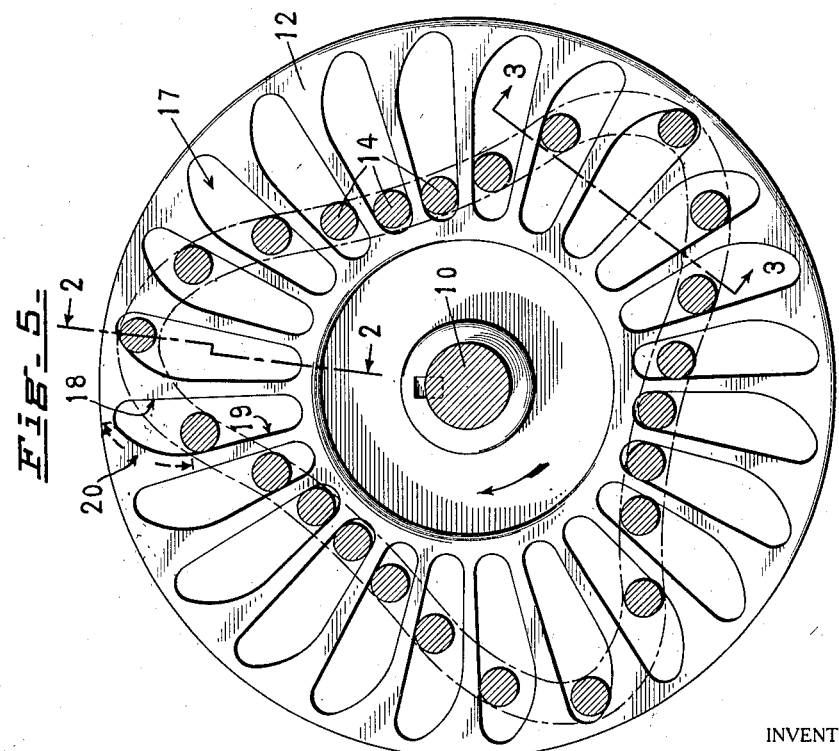
Fig. 5 is a detailed view of one of the parts of the mechanism showing the transmitting mass and in dot and dash the cam groove.

Power is assumed to be applied from the driving shaft 10 and work done by the driven member 11.

The mechanism essentially consists of three principal parts which may be termed the slotted driving wheel 12, the grooved casing 13 and a plurality of transmitting masses 14.

The wheel 12 is keyed to or otherwise suitably secured to the driving shaft 10. The casing 13 is suitably supported so that it may rotate with respect to the shaft 10 and may be supported upon it or otherwise supported. This casing is formed as shown in Fig. 6 of two disks or plates connected by a ring member 15. Each plate has grooves 16 in its inner wall in which the ends of the masses 14 are adapted to travel. The wheel 12 is provided with radially extending slots 17 through which the masses 14 extend.

I have shown 24 of the transmitting masses with a corresponding number of slots 17. The cam groove 16 preferably has a plurality of accelerating and decelerating sections so that each mass can perform its complete function a plurality of times during each rotation of the driving member with respect to the driven member.

Each of the slots 17 has a radial forward wall 18, radial rear wall 19 and a curved wall 20 serving to change the direction of movement of the masses located within that slot and avoid pressure against corresponding portions of the cam groove 16.

The inner wall of the groove 16 through an angle represented by the section 21 from Fig. 1 serves as an abutment for the masses 14 during which acceleration of the masses takes place.

Section 22 of the inner wall of the cam groove corresponds to section 20 of the wall of the slot 17, during which additional acceleration is produced to exceed the increase in linear velocity corresponding to the increased radius.

The increase in angular velocity produced by this forwardly extending curved wall 20 continues the pressure against the inner surface of the cam at 22 and adds to the kinetic energy of the masses. At the outer part of the cam groove is a section 24 which may be termed a neutral section because while traveling through this part of the groove the mass changes from a state of acceleration to deceleration.

Section 25 of the outer wall of the groove 16 controls the deceleration of the masses 14 during which they press on the forward wall 18 of the wheel slot 17.

Section 26 of the slot represents another neutral section where the masses change from a state of deceleration to renewed acceleration.

It will thus be seen that each mass is caused to accelerate and decelerate three times for each rotation of the driving member with respect to the driven member.

It should be understood, however, that I do not consider the invention limited to any particular number of such cycles of acceleration and deceleration. It should also be understood that although I propose to use a considerable number of masses 14 so as to distribute the pressure through a comparatively large number of elements, the particular number is not material to the invention.

The provision of a larger number of masses also more uniformly distributes power throughout the various parts of each rotation and thus produces a much better balance than is possible with a smaller number of masses.

By the construction and arrangement herein set forth each of the transmitting masses is doing a useful work throughout practically all of each rotation except through the so-called neutral section. Thus not only does the accelerating part of the cycle represented by the sections 21 and 22 of the cam groove of Fig. 1 produce the forward torque, but the decelerating section 25 also produces a forward torque by reason of the inertia of the masses which are then pressing against the outer wall of the raceway or groove.

In obtaining kinetic energy from the race during acceleration each mass exerts a forward pressure upon the inner wall of the race, and in giving up kinetic energy during deceleration it gives a forward pressure against the outer wall of the race, with a consequent continued forward torque.

The masses 14 may be either of uniform diameter as shown in Fig. 2 or the ends may be larger than the central portion as shown in the member 14 and in Fig. 4.

The raceway walls or cam groove will, of course, correspond in size or location with the diameters of the ends of the transmitting masses.

The mass accelerating inner walls of the race 21—22 and the mass decelerating outer walls of the race 25 both transmit a forward torque to the driven member when in operation.

Figure 7:
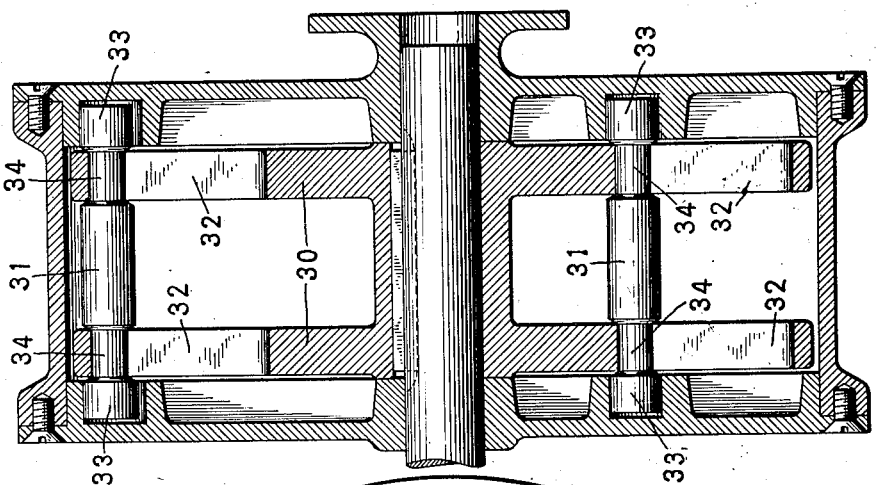
Fig. 7 is a similar sectional view showing another modification of the invention.

In the form shown in Fig. 7 the driving wheel 30 has two flanges spaced apart so that a longer transmitting roller 31 may be employed and so that it may have an enlarged central portion to give a greater mass with the same size and spacing of slots 32. The ends 33 may also be larger than the necks 34 so as to increase the mass and bearing surface for a given size slot.

Figure 8:
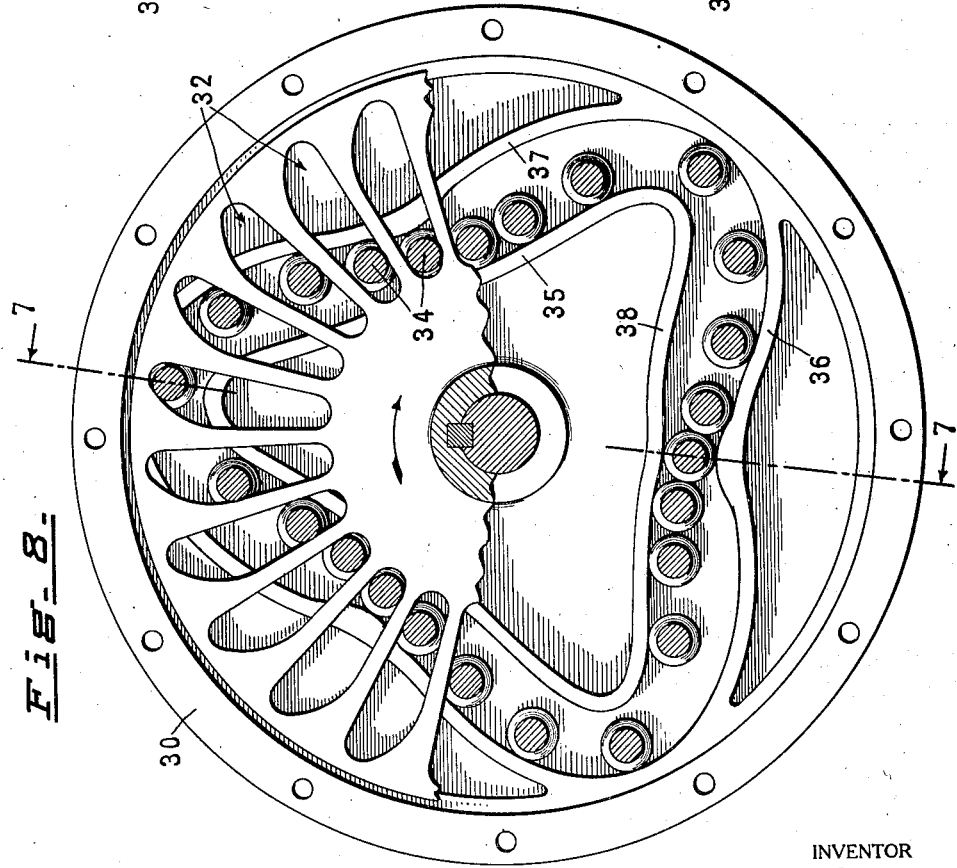
Fig. 8 is a side view and pressure section of the mechanism—parts being broken away.

The important parts of the race-ways in which the ends of the rollers, such as, 14 and 31 travel are the inner cam walls such as 35 (Fig. 8) which serve to force the rollers outwardly during acceleration and the outer cam walls 36 which force them inwardly during deceleration. These furnish the working surfaces.

The walls 37 and 38 serve principally to limit the loose play at those positions.

It will be understood that the rollers may be run in oil or otherwise lubricated.

According to my invention the masses 14 serve as coupling means between the driving and driven members due to their resistance to change of velocity. In most attempts to design inertia transmission the fact is forgotten that it takes resistance to decelerate a moving mass as well as to accelerate it. In my transmission the energy to accelerate comes from the driving member and the driven member takes the reaction as a forward torque. In deceleration the mass transfers its energy to the driving member with a reaction as forward torque on the driven member. As the driven member moves in response to this torque the time of acceleration and deceleration decreases and the power flows from the engine to the driven end with torque inversely proportional to its speed.

The primary requirement of the driving member is that it shall regulate the movement of each mass to a substantially uniform angular velocity for any given speed of engine; the secondary requirement is that it shall regulate the mass to an increased angular velocity and change its direction of travel near the end of its acceleration.

The requirements of the driven member are that its mass-accelerating and its mass-decelerating portions shall both give a forward torque thereto by acting against the resistance of the masses to change of velocity.

The inertia masses serve to transmit the power of the driving to the driven member with speed inversely proportional to load owing to their resistance to change of velocity.

I wish it understood that many details of construction may be changed within my invention.

I claim:

1. An automatically variable ratio power transmission having a driven member carrying a cam of substantially polygonal shape having its sides concaved inwardly at intervals and a driving member consisting of a disc having radial slots and roller masses engaging both the cam of the driven member and the slots of the driving member, so that the acceleration and deceleration of said masses will at substantially all times exert a uni-directional torque on said driven member.

2. An automatically variable-ratio power transmission mechanism having a driven member carrying a two faced cam and a driving member consisting of a disc having slots, the wall of each of which is substantially straight along one side and curved along a part of the other side and masses engaging both the cam of the driven member and the slots of the driving member, so that the acceleration and deceleration of said masses will at substantially all times exert a uni-directional torque on said driven member.

3. Power transmission apparatus comprising driving and driven members and a number of coacting inertia masses coupling said members together, one of said members having a cam with inner and outer walls with which said masses coact, each wall having a surface which is convex toward the axis throughout part of the circumference and concave throughout a part adjacent thereto whereby the acceleration and deceleration of said masses will at substantially all times produce a uni-directional torque on said driven member.

4. Power transmission apparatus comprising two relatively rotatably members and a number of transmitting rollers, one of said members having slots with walls which are substantially radial throughout a portion of their length, the rear wall of each slot having a curved portion connecting said wall with the front wall of said slot, and cam walls carried by the other member for forcing each roller to and from the axis of said members.

HENRY B. CHALMERS.